US007680027B2

(12) United States Patent
Manakkal et al.

(10) Patent No.: US 7,680,027 B2
(45) Date of Patent: Mar. 16, 2010

(54) METHODS AND SYSTEMS FOR CHANNEL ESTIMATION IN A COLLABORATIVE MULTI INPUT MULTIPLE OUTPUT (MIMO) COMMUNICATION SYSTEM

(75) Inventors: Rajesh Raja Manakkal, Santa Clara, CA (US); Sam P. Alex, Santa Clara, CA (US); Louay Jalloul, Santa Clara, CA (US)

(73) Assignee: BECEEM Communications Inc., Santa Clara, CA (US)

( * ) Notice: Subject to any disclaimer, the term of this patent is extended or adjusted under 35 U.S.C. 154(b) by 327 days.

(21) Appl. No.: 11/823,763

(22) Filed: Jun. 28, 2007

(65) Prior Publication Data

US 2008/0273453 A1 Nov. 6, 2008

Related U.S. Application Data

(60) Provisional application No. 60/927,685, filed on May 4, 2007.

(51) Int. Cl.
*H04J 11/00* (2006.01)
*H04L 5/12* (2006.01)
*H04L 5/16* (2006.01)
*H04W 4/00* (2006.01)
*H04J 1/00* (2006.01)
*H04B 1/38* (2006.01)

(52) U.S. Cl. .................. 370/203; 370/215; 370/334; 370/343; 370/480; 375/219

(58) Field of Classification Search ......... 370/203–209, 370/215, 310, 328–330, 334, 335, 336, 342, 370/343, 344, 478, 480
See application file for complete search history.

(56) References Cited

U.S. PATENT DOCUMENTS

| 6,452,917 | B1 * | 9/2002 | Leung .................. 370/342 |
| 6,493,379 | B1 * | 12/2002 | Tanaka et al. .......... 375/150 |
| 6,822,607 | B2 * | 11/2004 | Tanaka et al. .......... 342/377 |
| 2002/0013130 | A1 * | 1/2002 | Kim et al. ............. 455/70 |
| 2004/0100897 | A1 | 5/2004 | Shattil |
| 2005/0164658 | A1 * | 7/2005 | Oh et al. .............. 455/121 |
| 2005/0220207 | A1 | 10/2005 | Perlman et al. |
| 2005/0286408 | A1 * | 12/2005 | Jin et al. .............. 370/208 |
| 2006/0120470 | A1 * | 6/2006 | Hwang et al. .......... 375/260 |

(Continued)

*Primary Examiner*—Kevin C Harper
*Assistant Examiner*—Xavier Szewai Wong

(57) ABSTRACT

Methods and systems for estimating channel of one or more MSs in a collaborative MIMO communication system are provided. The method includes receiving a signal transmitted from a transmit antenna of a first MS and a transmit antenna of a second MS at a BTS using one or more receiver antennas. The method further includes computing one or more conjugate products for each of the first MS and the second MS using the signal. Thereafter, an average is determined over the plurality of receiver antennas and the plurality of tiles of the plurality of conjugate products for each of the first MS and the second MS. A phase determined based on the average of the plurality of conjugate products for the first MS and the second MS is divided into a first phase and a second phase for each of the first MS and the second MS. Additionally, the method includes determining a channel estimate for each tile of the first MS and the second MS at each receiver antennas. The method further includes performing predefined computations on the channel estimate of each tile of the first MS and the second MS at each receiver antenna of the BTS using the corresponding first phase and the corresponding second phase.

15 Claims, 5 Drawing Sheets

U.S. PATENT DOCUMENTS

| | | | |
|---|---|---|---|
| 2006/0159188 A1* | 7/2006 | Izumi | 375/260 |
| 2006/0285479 A1 | 12/2006 | Han et al. | |
| 2007/0060180 A1* | 3/2007 | Muharemovic et al. | 455/509 |
| 2007/0070967 A1* | 3/2007 | Yang et al. | 370/342 |
| 2007/0274409 A1* | 11/2007 | Park | 375/267 |
| 2008/0130611 A1* | 6/2008 | Branlund et al. | 370/342 |
| 2009/0129489 A1* | 5/2009 | Eldar et al. | 375/260 |

* cited by examiner

US 7,680,027 B2

METHODS AND SYSTEMS FOR CHANNEL ESTIMATION IN A COLLABORATIVE MULTI INPUT MULTIPLE OUTPUT (MIMO) COMMUNICATION SYSTEM

CROSS-REFERENCE TO RELATED APPLICATION

This application claims the benefit of U.S. Provisional Application Patent Application No. 60/927,685, filed on May 4, 2007, which is incorporated by reference in its entirety herein.

BACKGROUND

The present invention generally relates to communication systems. More specifically, the present invention relates to methods and systems for channel estimation in a Multiple Input Multiple Output (MIMO) communication system.

In a collaborative MIMO communication system, two Mobile stations (MSs) each having a transmit antenna can transmit signals to a Base Transceiver Station (BTS) on the same channel. Such a transmission is collaborative, since the signals transmitted from each of the transmit antennas of the two MSs, are spatially multiplexed through the utilization of the same tiles. The signal includes a plurality of tiles. In the collaborative UL PUSC tile structure, according to IEEE 802.16e standard, data sub-carriers of each of the two MSs are superimposed and pilot sub-carriers of each of the two MSs are placed on opposing corners of the tile.

While transmitting the signal from each MS to the BTS a timing offset may occur between each MS and the BTS. A timing offset occurs due mismatch between a clock at a transmitter of a MS and a clock at a BTS. Similarly, a frequency offset may occur between each MS and the BTS due to a Doppler and a local oscillator mismatch between the MS and BTS. Additionally, timing offsets and frequency offsets may occur due to temperature changes, aging and other factors.

Timing offset and frequency offset cause degradation in link performance. Further, timing offset and frequency offset induce a loss in Signal-to-Noise-Ratio (SNR) and can lead to Inter-Carrier Interference (ICI). A significant loss in SNR and presence of ICI contribute to sub-optimal estimation of the channel.

SUMMARY

An embodiment provides a method and system for estimating channel of one or more Mobile Stations (MSs) in a collaborative Multiple Input Multiple Output (MIMO) communication system.

Another embodiment provides a method and system for determining a timing offset and a frequency offset of a MS with a BTS in a collaborative MIMO communication system.

Embodiments listed below include a method and system for estimating channel of one or more MSs in a collaborative MIMO communication system. The method includes receiving signal transmitted from a transmit antenna of a first MS and a transmit antenna of a second MS at a BTS using a plurality of receiver antennas. The signal transmitted from the first MS and the second MS includes a plurality of tiles and each tile includes a plurality of pilot sub-carriers and a plurality of data sub-carriers. The method further includes computing a plurality of conjugate products for each of the first MS and the second MS using the signal. A conjugate product is computed for the plurality of pilot sub-carriers in a tile of the signal received at a receiver antenna of the BTS from a MS. Thereafter, an average is determined over the plurality of receiver antennas and the plurality of tiles of the plurality of conjugate products for each of the first MS and the second MS. A phase determined based on the average of the plurality of conjugate products for the first MS and the second MS is divided into a first phase and a second phase for each of the first MS and the second MS.

Additionally, the method includes determining a channel estimate for each tile of the first MS and the second MS at each receiver antenna. A channel estimate corresponding to a MS for a tile at a receiver antenna of the BTS is determined based on the phases and a plurality of pilot sub-carriers corresponding to the MS in the tile. The method further includes performing predefined computations on the channel estimate of each tile of the first MS and the second MS at each receiver antenna of the BTS using the corresponding first phase and the corresponding second phase.

BRIEF DESCRIPTION OF DRAWINGS

A more complete appreciation of the present invention is provided by reference to the following detailed description when considered in conjunction with the accompanying drawings in which reference symbols indicate the same or similar components, wherein.

DETAILED DESCRIPTION OF THE DRAWINGS

Various embodiments described herein provide methods and systems for estimating channel of one or more Mobile Stations (MSs) in a collaborative Multiple Input Multiple Output (MIMO) communication system. A signal can be transmitted from each of a transmit antenna of a first MS and a transmit antenna of a second MS to a Base Transceiver Station (BTS). The BTS receives the signal transmitted from the transmit antenna of the first MS and the transmit antenna of the second MS using a plurality of receiver antennas. A channel estimate is made at each receiver antenna of the BTS for each of the first MS and the second MS using the signal. The received signal is further used to compute a phase for each of the first MS and the second MS. The phase is thereafter divided into a first phase, which corresponds to timing offset, and a second phase, which corresponds to a frequency offset. A combine phase is generated using the first phase and the second phase for each of the first MS and the second MS. The combined phase is applied to the corresponding channel estimate for each of the first MS and the second MS.

Figure 1:
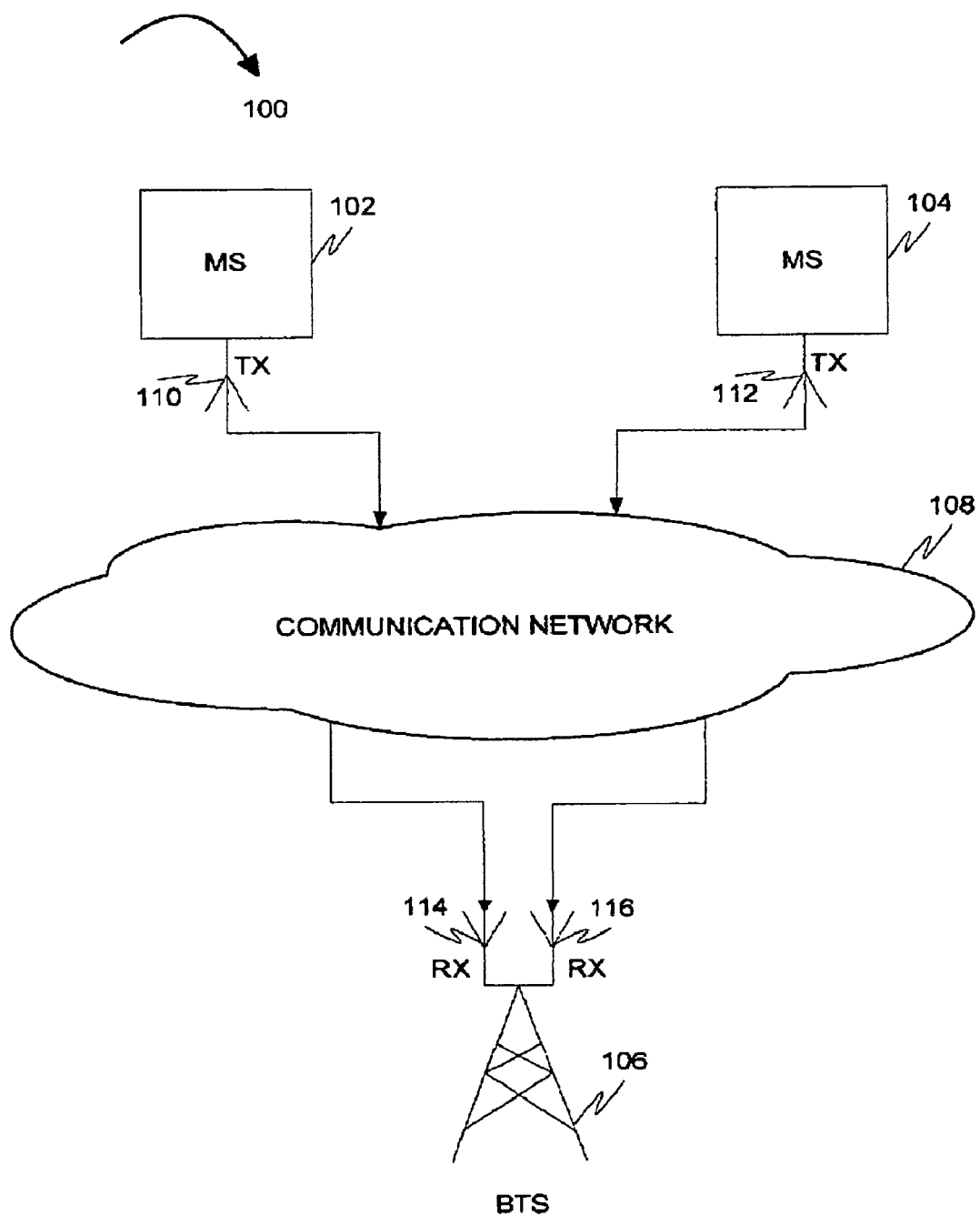
FIG. 1 is a block diagram showing a collaborative Multiple Input Multiple Output (MIMO) communication system (that is exemplary) in which various embodiments of the invention may function.

FIG. 1 is a block diagram showing a collaborative Multiple Input Multiple Output (MIMO) communication system 100 (that is exemplary) in which various embodiments of the invention may function. Collaborative MIMO communication system 100 includes MS 102, MS 104, and Base Transceiver Station (BTS) 106. It will be apparent to a person skilled in the art that collaborative MIMO communication system 100 may include more than two MSs. One or more of MS 102 and MS 104 may be involved in a collaborative Multiple Input Multiple Output (MIMO) communication with BTS 106 through a communication network 108 and may accordingly transmit signal to BTS 106. The transmission of the signal may be compliant with IEEE 802.16e. Examples of communication network 108 may include but are not limited to Orthogonal Frequency Division Multiplexing (OFDM) communication network, Orthogonal Frequency Division Multiple Access (OFDMA) communication network.

MS 102 uses transmit antenna 110 and MS 104 uses transmit antenna 112 to transmit the signal to BTS 106 through communication network 108. Each of MS 102 and MS 104 use the same tile to transmit the signal to BTS 106. In this case, the signal transmitted from MS 102 and MS 104 is compliant with IEEE 108.16e Collaborative Spatial Multiplexing (CSM). BTS 106 receives the signal transmitted from transmit antenna 110 and transmit antenna 112 through a plurality of receivers (for example, a receiver antenna 114 and a receiver antenna 116).

Figure 2:
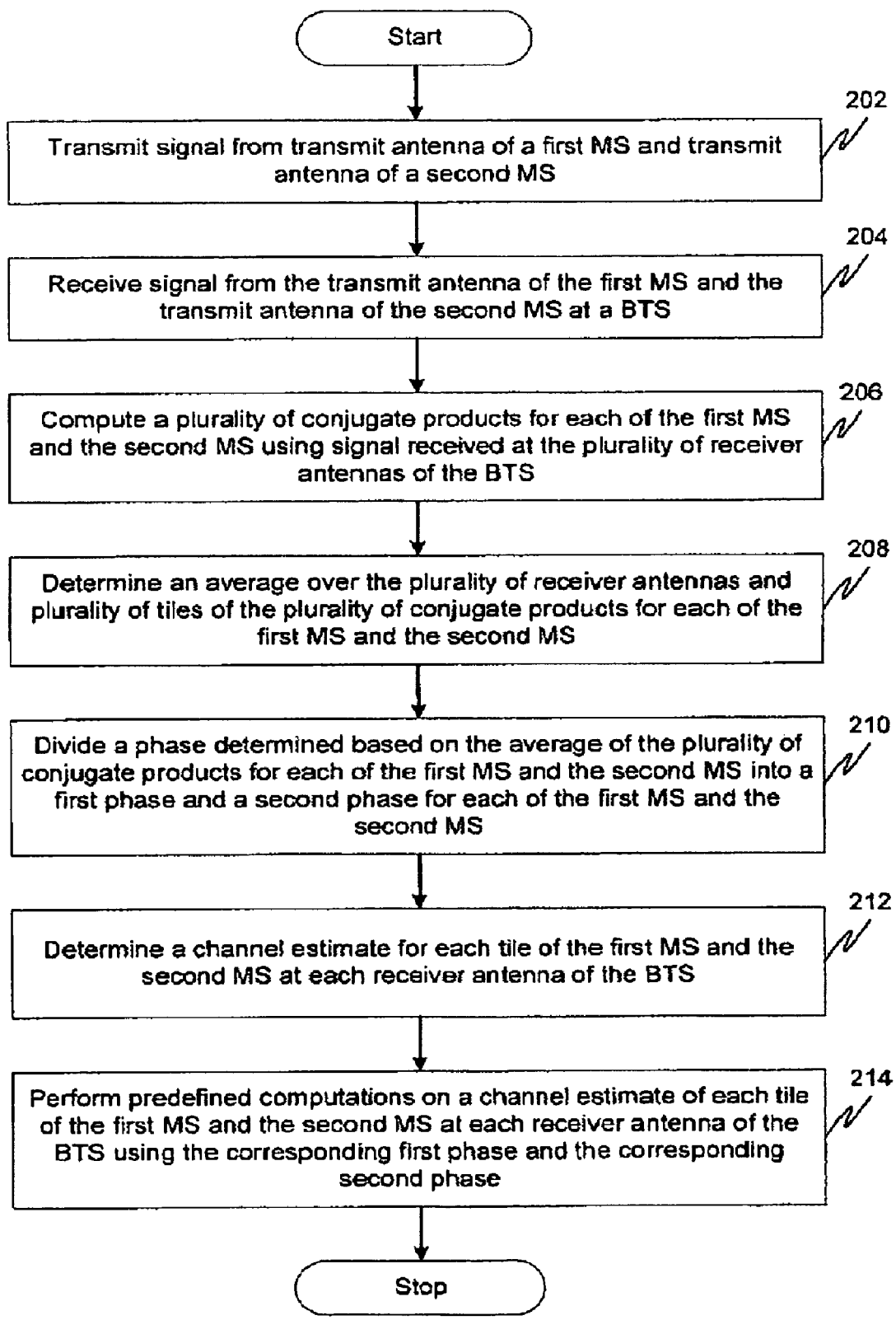
FIG. 2 is a flowchart for estimating channel of one or more Mobile Stations (MSs) in a collaborative MIMO communication system, in accordance with an embodiment.

FIG. 2 is a flowchart for estimating channel of one or more Mobile Stations (MSs) in collaborative MIMO communication system 100, in accordance with an embodiment. At 202, a signal is transmitted from transmit antenna 110 of MS 102 and transmit antenna 112 of MS 104. The transmission is compliant with IEEE 802.16e CSM. At 204, the signal transmitted from transmit antenna 110 and transmit antenna 112 is received at BTS 106 through the plurality of receiver antennas. The signal includes a plurality of tiles. Each tile in the signal includes a plurality of pilot sub-carries and a plurality of data sub-carriers related to MS 102 and MS 104. In an embodiment, data sub-carriers related to each of MS 102 and MS 104 in a tile of the signal are superimposed. Additionally, each tile of the signal includes a first set of pilot sub-carriers for MS 102 and a second set of pilot sub-carriers for MS 104. In an exemplary embodiment, a tile in the signal includes two pilot sub-carriers for MS 102 and two pilot sub-carriers for MS 104. The channel over which the signal is received at each receiver antenna of BTS 106 is a fading channel that can be assumed to be constant across each tile of the signal.

At BTS 106, a Fast Fourier Transformation (FFT) is performed on the received signal. The output of the FFT at the pilot sub-carrier location at a receiver antenna of BTS 106 may be represented by equation (1) given below:

$$Y_{i,p}(k, l) = \exp[j(\theta_t(k) + \theta_f(l))]H_{i,p}(k, l)X_p(k, l) + U_{i,p}(k, l) \quad (1)$$

where, $Y_{i,p}(k,l)$ is the signal at $i^{th}$ receiver antenna of BTS 106, over the $k^{th}$ pilot sub-carrier and $l^{th}$ OFDM time symbol corresponding to the MS in $p^{th}$ tile of the signal after the FFT output signal is de-Pseudorandom Binary Sequence (PRBSed) with the corresponding PRBS at the receiver antenna of BTS 106;

$H_{i,p}(k,l)$ is a frequency response of the channel in the $k^{th}$ pilot sub-carrier, $l^{th}$ OFDM time symbol and $i^{th}$ receiver antenna and in $p^{th}$ tile of the signal;

$X_p(k,l)$ is a boosted binary phase shift keying (BPSK) pilot symbol in the $k^{th}$ pilot sub-carrier and $l^{th}$ OFDM time symbol in $p^{th}$ tile of the signal; and $U_{i,p}(k,l)$ is a noise plus interference in the $k^{th}$ pilot sub-carrier, $l^{th}$ OFDM time symbol and $i^{th}$ receiver antenna in $p^{th}$ tile of the signal.

Further, referring to equation (1), $$\theta_t(k) = -2\pi \frac{k}{N} \Delta\tau$$

$$\theta_f(l) = 2\pi l\varepsilon; \quad \varepsilon = \frac{\Delta f}{(W/N)}$$

where, $\theta_t(k)$ denotes a phase in the signal for the MS across the frequency dimension;

$\theta_f(l)$ denotes a phase in the signal for the MS across the time dimension;

$\varepsilon$ is a normalized frequency offset pertaining to a Doppler and a local oscillator mismatch between a clock of the MS and BTS 106;

$\Delta\tau$ is a timing offset related to the signal for the MS;

$\Delta f$ is a frequency offset related to the signal for the MS;

W is a bandwidth of the channel related to the MS; and

N is the size of the FFT applied to the signal.

Figure 4:
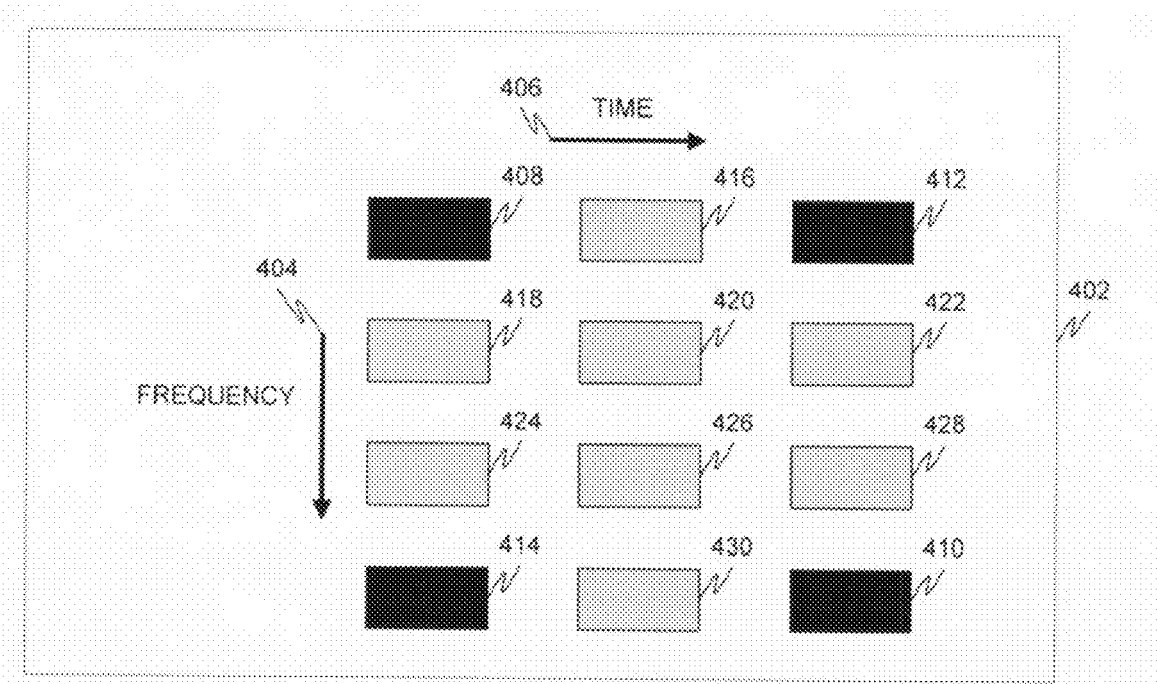
FIG. 4 shows the estimation of channel of a first MS and a second MS in a tile of a signal transmitted from the first MS and the second MS to BTS in a collaborative MIMO communication system, in accordance with an exemplary embodiment.

At 206, a plurality of conjugate products are computed for each of MS 102 and MS 104 using the signal received at each receiver antenna of BTS 106. A plurality of conjugate product for each of MS 102 and MS 104 is computed over the plurality of tiles in the signal. A conjugate product is computed for the plurality of pilot sub-carriers in a tile of a signal received at a receiver antenna of a BTS from a MS. For example, for MS 102, a conjugate product is computed for the first set of pilot sub-carriers of MS 102 in each tile of the signal at each receiver antenna of BTS 106. Similarly, a conjugate product is computed for MS 104. This is further explained in detail in conjunction with FIG. 4 given below. In an exemplary embodiment, a plurality of conjugate products for a MS may be computed using equation (2) given below:

$$\sum_{i=1}^{N_r} \sum_{p=1}^{P} [Y_{i,p}^*(k, l)Y_{i,p}(k+u, l+v)] \quad (2)$$

where, u represents the offset in the frequency dimension; and v represents the offset in the time dimension.

At 208, an average of the plurality of conjugate products for each of MS 102 and MS 104 is determined over the plurality of receiver antennas of BTS 106 and the plurality of tiles in the signal. For example, for MS 102, an average is determined for the plurality of conjugate products for MS 102, which are computed for the first set of pilot sub-carriers for MS 102 in each tile of the signal. Similarly, an average is determined for the plurality of conjugate products for MS 104. This is further explained in detail in conjunction with FIG. 4. Thereafter, a phase is determined for each of MS 102 and MS 104 based on the average of the plurality of conjugate products. For example, for MS 102, a phase is determined from the average of the plurality of conjugate products for MS 102. Similarly, for MS 104, a phase is determined from the average of the plurality of conjugate products for MS 104. This is further explained in detail in conjunction with FIG. 4. The phase determined for a MS represents an accumulative phase offset contributed by each of a frequency offset and a timing offset of the MS with respect to BTS 106 in the signal. For example, timing offset of MS 102 with respect to BTS 106 may contribute half of the phase determined for MS 102 and frequency offset of MS 102 with respect to BTS 106 may also contribute half of the phase determined for MS 102. In an exemplary embodiment, the phase for a MS can be determined using equation (3) defined below:

$$\theta_{est} = \arg\left\{\frac{1}{N_r}\frac{1}{P}\sum_{i=1}^{N_r}\sum_{p=1}^{P}[Y_{i,p}^*(k,l)Y_{i,p}(k+u,l+v)]\right\} \quad (3)$$

where, $\theta_{est}$ is the phase estimated for a phase deviation from the $k^{th}$ pilot sub-carrier and $l^{th}$ time symbol of the signal to $(k+u)^{th}$ pilot sub-carrier and $(l+v)^{th}$ symbol of the signal transmitted from the MS;

$N_r$ is the number of receiver antennas at BTS 106; and

P is the number of tiles over which the estimation of phase is performed.

In equation (3), an average is obtained by normalizing a sum of the plurality of conjugate products for the MS over the number of receiver antennas at BTS 106 and the number of tiles over which the estimation of the phase is performed. It will be apparent to a person skilled in the art that the normalization carried out using the number of receiver antennas at BTS 106 and the number of tiles over which the estimation of phase is performed may be ignored as only the phase of the sum of the plurality of conjugate products for the MS is needed.

Thereafter, at 210, a phase determined for each of MS 102 and MS 104 is divided into a first phase and a second phase for each of MS 102 and MS 104. The first phase corresponds to a timing offset of a MS from BTS 106 and the second phase corresponds to a frequency offset of a MS from BTS 106. Based on the contribution of the timing offset and the frequency offset on the phase, the first phase of a MS is assigned a first weight and the second phase of the MS is assigned a second weight. The sum of the first weight and the second weight is equal to one for the MS. For example, for MS 102, timing offset between MS 102 and BTS 106 may contribute 60 percent of the phase determined for MS 102, which corresponds to the first phase associated with MS 102. Similarly, frequency offset between MS 102 and BTS 106 may contribute 40 percent of the phase determined for MS 102, which corresponds to the second phase associated with MS 102. Therefore, the first phase for MS 102 is assigned a weight of 0.6 and the second phase for the MS 102 is assigned a weight of 0.4. In an exemplary embodiment, the first phase and the second phase for a MS may be obtained using equation 4 and equation 5 given below:

$$\theta_{est,t} = \beta\theta_{est} \quad (4)$$

$$\theta_{est,f} = (1-\beta)\theta_{est} \quad (5)$$

where, $\theta_{est,t}$ is the first phase due to the timing offset in the signal received at the plurality of receiver antennas of BTS 106 from the MS;

$\theta_{est,f}$ is the second phase due to frequency offset in the signal received at the plurality of receiver antennas of BTS 106 from the MS; and $\beta$ is a parameter, where, $0 \leq \beta \leq 1$.

In equation (4), the parameter $\beta$ is the first weight associated with the first phase of the MS. Similarly, in equation (5), $(1-\beta)$ is the second weight associated with the second phase related the MS. The value of $\beta$ can be set to 1, if the signal received at the plurality of receiver antennas of BTS 106 from the MS is impaired by timing offset only. Alternately, the value of $\beta$ can be set to 0, if the signal received at the plurality of receiver antennas of BTS 106 is impaired by frequency offset only. However, if both timing offset and frequency offset contribute to the impairment of the signal received at the plurality of receiver antennas of BTS 106, the value of $\beta$ can be chosen in accordance with a maximum allowable timing offset value and frequency offset value defined in IEEE 802.16e. If the timing offset and the frequency offset contribute equally to the impairment of the signal, the value of $\beta$ can be chosen as 0.5.

At 212, a channel estimate is determined for each tile in the signal for each of MS 102 and MS 104 at each receiver antenna of BTS 106. A channel estimate corresponding to a MS for a tile at a receiver antenna of BTS 106 is determined based on the phase and the plurality of pilot sub-carriers related to the MS in the tile of the signal. For example, for MS 102, a channel estimate for a tile in the signal at receiver antenna 114 is determined based on the phase determined for MS 102 and the first set of pilot sub-carriers in the tile. This is explained in detail in conjunction with FIG. 4 given below.

In an exemplary embodiment, the channel estimate of a MS for a tile at a receiver antenna of BTS 106 can be determined based on the weighted average of two pilot-sub-carriers of the MS in the tile using equation 6 given below:

$$\hat{h}_{i,p} = \frac{1}{2\sqrt{2}}\left[Y_{i,p}(k,l)\exp\left(j\frac{\theta_{est}}{2}\right) + Y_{i,p}(k+u,l+v)\exp\left(-j\frac{\theta_{est}}{2}\right)\right] \quad (6)$$

where, $\hat{h}_{i,p}$ is the channel estimate of the MS for the p-th tile and i-th BTS receive antenna; and each of the two pilot sub-carriers are updated using the phase determined for the MS.

In equation (6) given above, the factor "$\sqrt{2}$" is employed for de-boosting the two pilot sub-carriers corresponding to the MS in the tile, as the two pilot sub-carriers in the tile are boosted by 3 dB at the MS, when the signal is transmitted from the MS to BTS 106.

In another exemplary embodiment, channel estimate of a MS for a tile at a receiver antenna of BTS 106 can be determined based on average of two pilot-sub-carriers of the MS in the tile using equation 7 given below:

$$\hat{h}_{i,p} = \frac{1}{2\sqrt{2}}[Y_{i,p}(k,l) + Y_{i,p}(k+u,l+v)] \quad (7)$$

Similar to equation (6), in equation (7) the factor "$\sqrt{2}$" is employed for de-boosting the two pilot sub-carriers corresponding to the MS in the tile.

After determining the channel estimate for each tile for each of MS 102 and MS 104, at 214, predefined computations are performed on a channel estimate of each tile for MS 102 and MS 104 at each receiver antenna of BTS 106 using the corresponding first phase and the corresponding second phase. For example, for MS 102, predefined computations are performed on a channel estimate of each tile for MS 102 at each receiver antenna of BTS 106 using the first phase and the second phase associated with MS 102. The performing of predefined computations is explained in detail in conjunction with FIG. 3 given below.

Figure 3:
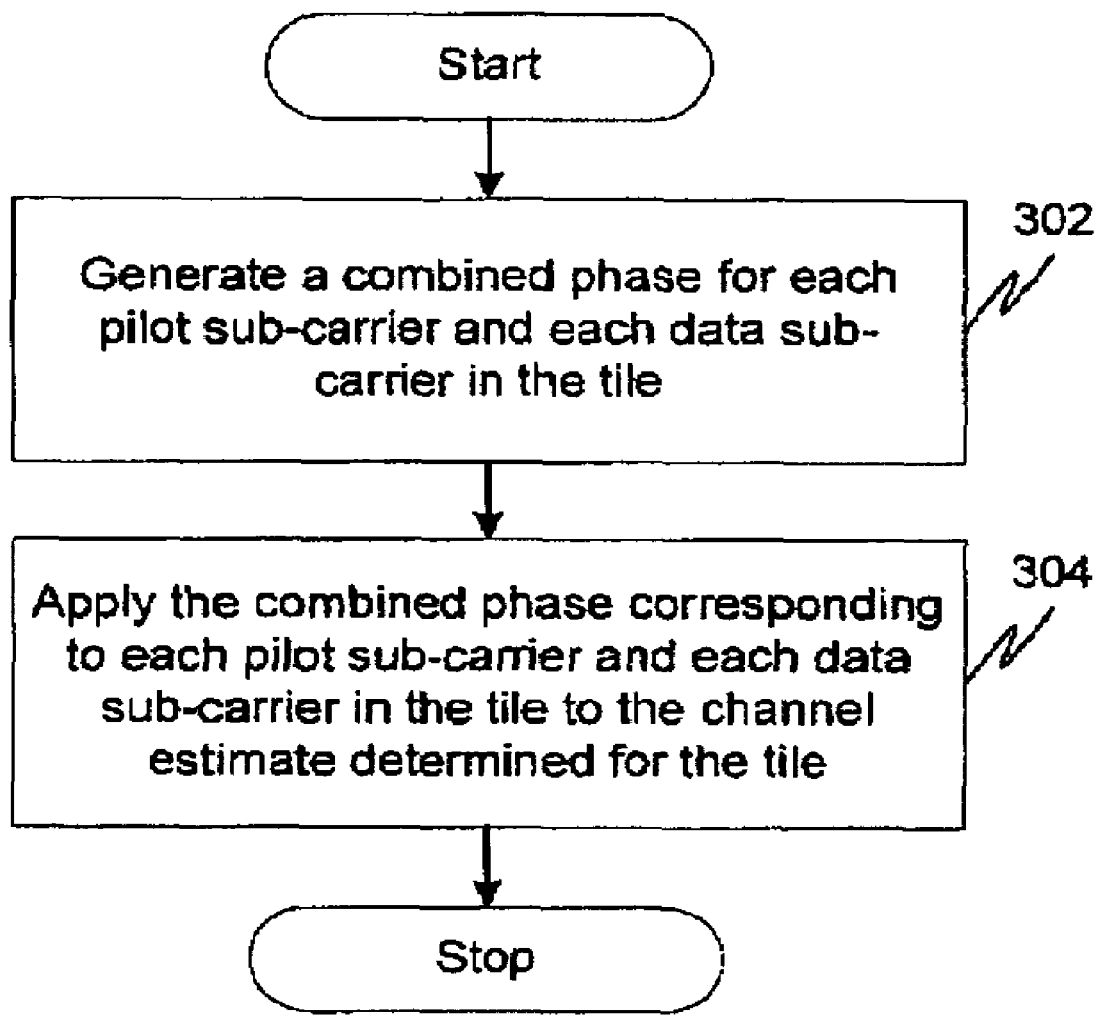
FIG. 3 is a flowchart for performing predefined computations on a channel estimate of a tile for a MS at the plurality of receiver antennas of a BTS in a collaborative MIMO communication system 100, in accordance with an embodiment.

FIG. 3 is a flowchart for performing predefined computations on a channel estimate of a tile for a MS at the plurality of receiver antennas of BTS 106 in collaborative MIMO communication system 100, in accordance with an embodiment. At 302, a combined phase is generated for each pilot sub-carrier and each data sub-carrier in the tile for the MS by weighting the first phase and second phase. For example, for MS 102, a combined phase may be generated for each pilot sub-carrier and each data sub-carrier in the tile, which is associated with MS 102, by weighting the first phase and the second phase computed for MS 102. Further, the combined phase generated for each pilot sub-carrier and each data sub-carrier in the tile for the MS is applied to the channel estimate determined for the tile for the MS at 304. This is further explained in conjunction with FIG. 4 given below. In an exemplary embodiment, the combined phase may be generated using equation 8 given below:

$$\tilde{h}_{i,p}(k,l) = \hat{h}_{i,p} e^{j(a(k,l)\theta_{est,t} + b(k,l)\theta_{est,f})} \quad (8)$$

where, a and b are weights associated with the first phase and the second phase respectively.

FIG. 4 shows the estimation of channel of MS 102 and MS 104 in a tile 402 of a signal transmitted from MS 102 and MS 104 to BTS 106 in collaborative MIMO communication system 100, in accordance with an exemplary embodiment. Tile 402 of the signal is used by each of MS 102 and MS 104 to transmit the signal. Tile 402 includes four consecutive sub-carriers along the frequency dimension indicated by 404 and three consecutive time symbols along the time dimension indicated by 406. A sub-carrier in tile 402 may be one of a pilot sub-carrier and a data sub-carrier. In tile 402, two pilot sub-carriers of MS 102 are positioned at 408, which corresponds to the first sub-carrier and the first time symbol, and 410, which corresponds to the fourth sub-carrier and the third time symbol. The pilot sub-carrier of MS 102 positioned at 408 may be represented as Y (1, 1) and the pilot sub-carrier of MS 102 positioned at 410 is represented as Y (4, 3). Additionally, in tile 402, two pilot sub-carriers of MS 104 are positioned at 412, which corresponds to the first sub-carrier and the third time symbol, and 414, which corresponds to the fourth sub-carrier and the first time symbol. The pilot sub-carrier of MS 104 positioned at 412 may be represented as Y (1, 3) and the pilot sub-carrier of MS 102 positioned at 414 is represented as Y (4, 1). Further, a plurality of data sub-carriers of MS 102 and MS 104 are superimposed at positions 416, 418, 420, 422, 424, 426, 428, and 430 in tile 402.

Referring back to FIG. 2, for MS 102, considering a phase offset between 408 and 410 in tile 402, a conjugate product for pilot sub-carriers positioned at 408 and 410 is computed at each of receiver antenna 114 and receiver antenna 116 of BTS 106 using equation 9 given below:

$$\sum_{p=1}^{P} \sum_{i=1}^{2} [Y_{i,p}^*(1, 1) Y_{i,p}(4, 3)] \quad (9)$$

Thereafter, the average of the conjugate product for MS 102 in tile 402 is determined using equation 10 given below:

$$\frac{1}{2P} \sum_{p=1}^{P} \sum_{i=1}^{2} [Y_{i,p}^*(1, 1) Y_{i,p}(4, 3)] \quad (10)$$

The average of the conjugate product is used to determine the phase that results due to the timing offset and the frequency offset in the signal between transmit antenna 110 of MS 102 and each of receiver antenna 114 and receiver antenna 116 of BTS 106. The phase can be determined as using equation 11 given below:

$$\theta_{est} = \arg\left\{ \frac{1}{2P} \sum_{p=1}^{P} \sum_{i=1}^{2} [Y_{i,p}^*(1, 1) Y_{i,p}(4, 3)] \right\} \quad (11)$$

Thereafter, to determine the first phase and the second phase for MS 102 in tile 402 from the phase, the parameter β is assigned a value of 0.5 as an exemplary value. Therefore, the phase determined by equation 11 can be divided into the first phase and the second phase using 0.5 value of β as:

$$\theta_{est,t} = 0.5 \theta_{est} \quad (12)$$

$$\theta_{est,f} = (1 - 0.5) \theta_{est} \quad (13)$$

where, $\theta_{est,t}$ is the first phase related to the timing offset for MS 102 in tile 402 of the signal received at receiver antenna 114 and receiver antenna 116 of BTS 106; and $\theta_{est,f}$ is the second phase related to the frequency offset for MS 102 in tile 402 of the signal received at receiver antenna 114 and receiver antenna 116 of BTS 106.

Thereafter, the channel estimate of tile 402 for MS 102 is determined using equation 14 given below:

$$\tilde{h}_{i,p} = \frac{1}{2\sqrt{2}} \left[ Y_{i,p}(1, 1) \exp\left(j \frac{\theta_{est}}{2}\right) + Y_{i,p}(4, 3) \exp\left(-j \frac{\theta_{est}}{2}\right) \right] \quad (14)$$

After computing the channel estimate, combined phase is generated for each of the pilot sub-carriers and each data sub-carrier in tile 402 for MS 102. The combined phase is generated by weighting the first phase and the second phase along each pilot sub-carrier and each data sub-carrier in tile 402 for MS 102 and is represented by equation (15):

$$\text{Combined phase} = \lfloor a(k,l)\theta_{est,t} + b(k,l)\theta_{est,f} \rfloor \quad (15)$$

Weights are assigned to the first phase and the second phase based on the position of the sub-carrier in tile 402 for MS 102.

Thereafter, the combined phase generated for each pilot sub-carrier and each data sub-carrier in tile 402 for MS 102 is applied to the channel estimate determined in equation (14). In this exemplary embodiment, a phase modified channel estimate for each pilot sub-carrier and each data sub-carrier in tile 402 for MS 102 is illustrated by block 432. Similarly, the combined phase generated for each pilot sub-carrier and each data sub-carrier in tile 402 for MS 104 is applied to the channel estimate that can be determined using equation (6) described above.

Figure 5:
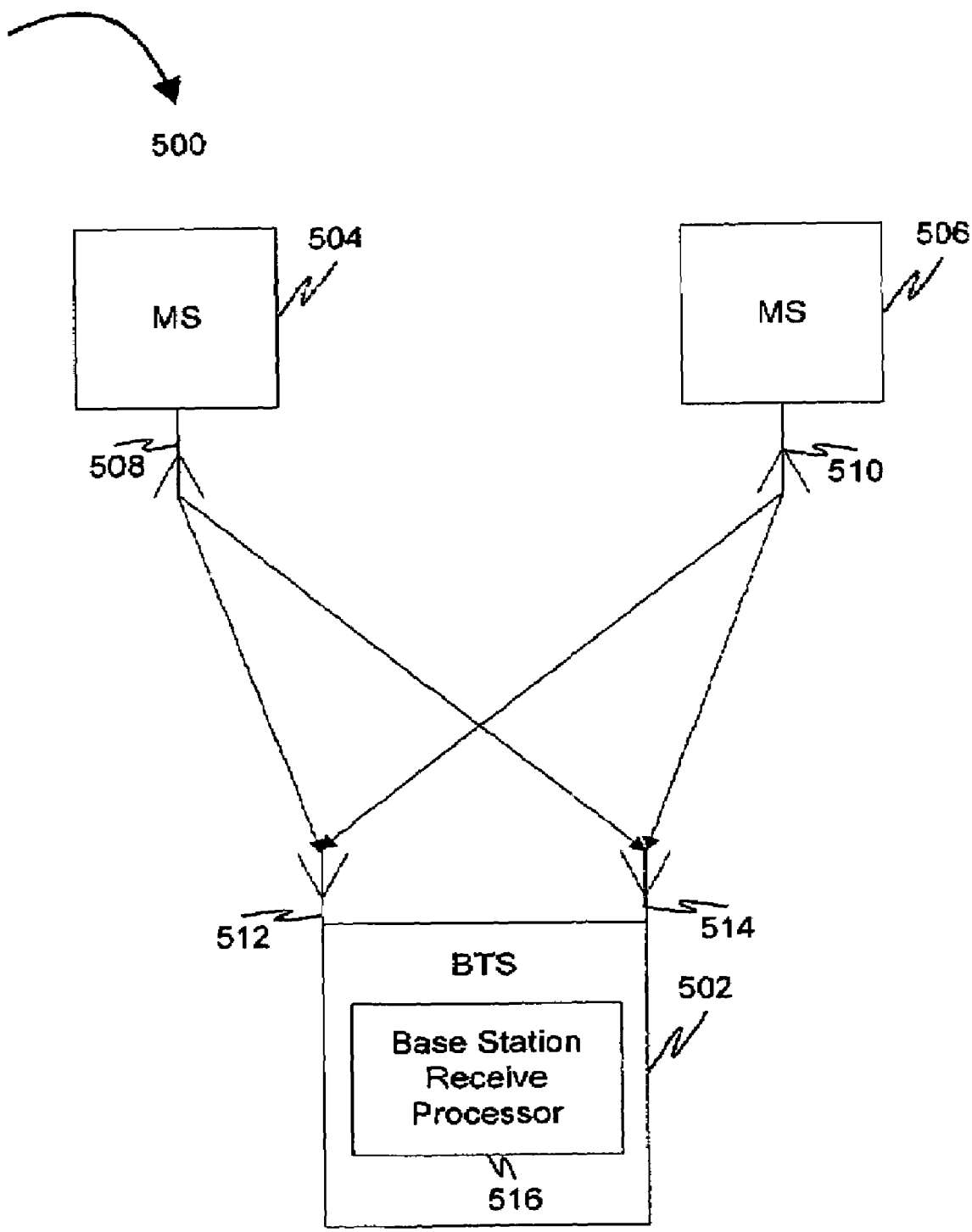
FIG. 5 is a block diagram of a system for estimating channel of one or more Mobile Stations in a collaborative MIMO communication system, in accordance with an embodiment.

FIG. 5 is a block diagram of a system 500 for estimating channel of one or more Mobile Stations (MSs) in collaborative Multiple Input Multiple Output (MIMO) communication system 100, in accordance with an embodiment. System 500 includes a plurality of MSs and a BTS 502. Each MS includes a transmit antenna configured to transmit signal. A MS 504 and a MS 506 are involved in a collaborative MIMO communication with BTS 502. A transmit antenna 508 of MS 504 and a transmit antenna 510 of MS 506 transmits a signal to BTS 502. The signal is received by a plurality of receiver antennas (for example, a receiver antenna 512 and a receiver antenna 514) of BTS 502. The signal transmitted from MS 504 and MS 506 includes a plurality of tiles. Each tile includes a plurality of pilot sub-carriers and a plurality of data sub-carriers related to one or more of MS 504 and MS 506. In an embodiment, each of the plurality of tiles includes a first set of pilot sub-carriers related to MS 504 and a second set of pilot sub-carriers related to MS 506. The data sub-carriers for MS 504 and the data sub-carriers for MS 506 are superimposed in a tile. This has been explained in conjunction with FIG. 2 given above.

A base station receive processor 516 in BTS 502 uses the signal, which is received by each receiver antenna of BTS 502, to compute a plurality of conjugate products for each of MS 504 and MS 506. A conjugate product is computed for the plurality of pilot sub-carriers in a tile of the signal received at a receiver antenna of BTS 502 from a MS. Thereafter, base station receive processor 516 determines an average of the plurality of conjugate products for each of MS 504 and MS 506. Base station receive processor 516 then divides a phase determined based on the average of the plurality of conjugate products for each of MS 504 and MS 506 into a first phase and a second phase. The first phase is related to a timing offset of each of MS 504 from BTS 502 and MS 506 from BTS 502. The second phase is related to a frequency offset of each of MS 504 from BTS 502 and MS 506 from BTS 502. A first weight is associated with the first phase and a second weight is associated with the second phase. The sum of the first weight and the second weight is equal to one. This has been explained in detail in conjunction with FIG. 2 given above.

Base station receive processor 516 thereafter determines a channel estimate for each tile for MS 504 and MS 506 at each receiver antenna of BTS 502. A channel estimate for a tile related to a MS is determined at a receiver antenna based on the phase and two pilot sub-carriers corresponding to the MS in the tile. Base station receive processor 516 performs predefined computations on the channel estimate of each tile of MS 504 and MS 506 at each receiver antenna of BTS 502 using the corresponding first phase and the corresponding second phase. This has been explained in detail in conjunction with FIG. 2 given above.

To perform the predefined computations on a channel estimate of a tile for a MS at each receiver antenna of BTS 502, base station receive processor 516 generates a combined phase for each pilot sub-carrier and each data sub-carrier in the tile by weighting the corresponding first phase and the corresponding second phase for the MS. Thereafter, base station receive processor 516 applies the combined phase related to each pilot sub-carrier and each data sub-carrier in the tile to the channel estimate determined for the tile for the MS. This has been explained in detail in conjunction with FIG. 2 given above.

Various embodiments of the invention provide methods and systems for channel estimation in a collaborative Multiple Input Multiple Output (MIMO) communication system. The method described above facilitates efficiently estimating channel of one or more MSs involved in a collaborative MIMO communication with a BTS, when a signal transmitted from one or more MSs is impaired due to one or more of a timing offset and a frequency offset.

What is claimed is:

1. In a collaborative Multiple Input Multiple Output (MIMO) communication system having a Base Transceiver Station (BTS) and a plurality of Mobile Stations (MSs), the BTS having a plurality of receive antennas and each MS having a transmit antenna, a method for estimating channel of at least one MS, the method comprising:

receiving signal from a transmit antenna of a first MS and a transmit antenna of a second MS at the BTS, wherein a signal comprises a plurality of tiles, each tile comprises a plurality of pilot sub-carriers and a plurality of data sub-carriers corresponding to at least one of the first MS and the second MS;

computing conjugate products for each of the first MS and the second MS using signals received at each of the plurality of receiver antennas of the BTS, wherein a conjugate product is computed for the plurality of pilot sub-carriers in a tile of a signal received at each receiver antenna of the BTS;

determining an average over the plurality of receiver antennas and plurality of tiles of the plurality of conjugate products for each of the first MS and the second MS;

dividing a phase determined based on the average of the plurality of conjugate products for each of the first MS and the second MS into a first phase and a second phase for each of the first MS and the second MS;

determining a channel estimate for each tile in the signal for the first MS and the second MS at each receiver antenna of the BTS, wherein a channel estimate corresponding to a MS for a tile at a receiver antenna of the BTS is determined based on the phase and a plurality of pilot sub-carriers corresponding to the MS in the tile; and performing predefined computations on the channel estimate of each tile of the first MS and the second MS at each receiver antenna of the BTS using the corresponding first phase and the corresponding second phase;

wherein the predefined computations performed comprise;

generating a combined phase for each pilot sub-carrier and each data sub-carrier in the tile by weighting the first phase and the second phase;

applying the combined phase corresponding to each pilot sub-carrier and each data sub-carrier in the tile to the channel estimate determined for the tile.

2. The method of claim 1 further comprising transmission of signal from each transmit antenna of the first MS and the second MS, wherein the transmission is compliant with IEEE 802.16e Collaborative Spatial Multiplexing (CSM).

3. The method of claim 1, wherein data sub-carriers of the first MS and data sub-carriers of the second MS are superimposed in a tile.

4. The method of claim 1, wherein a tile comprises a first set of pilot sub-carriers corresponding to the first MS and a second set of pilot sub-carriers corresponding to the second MS.

5. The method of claim 1, wherein the first phase corresponds to a timing offset of a MS from the BTS.

6. The method of claim 1, wherein the second phase corresponds to a frequency offset of a MS from the BTS.

7. The method of claim 1, wherein a first weight is assigned to the first phase and a second weight is assigned to the second phase, the sum of the first weight and the second weight is equal to one.

8. The method of claim 1, wherein the determining a channel estimate is based on linear averaging two pilot sub-carriers in a tile of a MS.

9. The method of claim 1, wherein the determining of a channel estimate is based on a weighted-average of the two pilot sub-carriers each updated by the phase.

10. A system for estimating channel in a collaborative Multiple Input Multiple Output (MIMO) communication system, the system comprising:
- a plurality of Mobile Stations (MSs), wherein each MS comprises a transmit antenna configured to transmit signal; and
- a Base Transceiver Station (BTS) comprising:
  - a plurality of receiver antennas, each receiver antenna configured to receive signal from a transmit antenna of a first MS and a second MS at a BTS, wherein a signal comprises a plurality of tiles, each tile comprises a plurality of pilot sub-carriers and a plurality of data sub-carriers corresponding to at least one of the first MS and the second MS; and
  - a base station receive processor configured to:
    - compute a plurality of conjugate products for each of the first MS and the second MS using signal received at the plurality of receiver antennas of the BTS from the first MS and the second MS, wherein a conjugate product is computed for the plurality of pilot sub-carriers in a tile of a signal received at a receiver antenna of the BTS from a MS;
    - determine an average of the plurality of conjugate products for each of the first MS and the second MS;
    - divide a phase determined based on the average of the plurality of conjugate products for each of the first MS and the second MS into a first phase and a second phase;
    - determine a channel estimate for each tile in the signal for the first MS and the second MS at each receiver antenna of the BTS, wherein a channel estimate corresponding to a MS for a tile at a receiver antenna of the BTS is determined based on the phase and a plurality of pilot sub-carriers corresponding to the MS in the tile; and
    - perform predefined computations on the channel estimate of each tile of the first MS and the second MS at each receiver antenna of the BTS using the corresponding first phase and the corresponding second phase;
  - wherein the predefined computations performed on a channel estimate of a tile for a MS at each receiver antenna of the BTS comprises:
- generating a combined phase for each pilot sub-carrier and each data sub-carrier in the tile by weighting the corresponding first phase and the corresponding second phase;
- applying the combined phase corresponding to each pilot sub-carrier and each data sub-carrier in the tile to the channel estimate determined for the tile.

11. The system of claim 10, wherein data sub-carriers of the first MS and data sub-carriers of the second MS are superimposed in a tile.

12. The system of claim 10, wherein a tile comprises a first set of pilot sub-carriers corresponding to the first MS and a second set of pilot sub-carriers corresponding to the second MS.

13. The system of claim 10, wherein the first phase corresponds to a timing offset of a MS from the BTS.

14. The system of claim 10, wherein the second phase corresponds to a frequency offset of a MS from the BTS.

15. The system of claim 10, wherein a first weight is assigned to the first phase and a second weight is assigned to the second phase, the sum of the first weight and the second weight is equal to one.

* * * * *